US008320310B2

(12) United States Patent
Mazzarese

(10) Patent No.: US 8,320,310 B2
(45) Date of Patent: Nov. 27, 2012

(54) SDMA COMMUNICATION SYSTEM FOR FEEDING BACK CHANNEL STATE INFORMATION AND METHOD SUPPORTING THE SAME

(75) Inventor: David Mazzarese, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 950 days.

(21) Appl. No.: 12/378,906

(22) Filed: Feb. 20, 2009

(65) Prior Publication Data

US 2009/0207799 A1    Aug. 20, 2009

(30) Foreign Application Priority Data

Feb. 20, 2008 (KR) .................. 10-2008-0015564

(51) Int. Cl.
*H04B 7/212* (2006.01)
*H04W 4/00* (2009.01)
*H04L 12/26* (2006.01)
(52) U.S. Cl. .................. 370/329; 370/337; 370/252
(58) Field of Classification Search .................. 370/252, 370/310–350, 466–467
See application file for complete search history.

(56) References Cited

U.S. PATENT DOCUMENTS

| 7,536,205 | B2* | 5/2009 | Van Rensburg et al. ... 455/562.1 |
| 7,620,019 | B1* | 11/2009 | Smith et al. .................. 370/334 |
| 8,073,069 | B2* | 12/2011 | Mundarath et al. .......... 375/267 |
| 8,130,727 | B2* | 3/2012 | Sambhwani et al. ......... 370/335 |
| 2005/0147023 | A1* | 7/2005 | Stephens et al. .............. 370/203 |
| 2006/0209754 | A1* | 9/2006 | Ji et al. .......................... 370/329 |
| 2007/0019535 | A1* | 1/2007 | Sambhwani et al. ......... 370/203 |
| 2007/0223423 | A1* | 9/2007 | Kim et al. ..................... 370/334 |
| 2007/0274256 | A1* | 11/2007 | Murai et al. .................. 370/328 |
| 2008/0181162 | A1* | 7/2008 | Stephens et al. .............. 370/312 |
| 2008/0214198 | A1* | 9/2008 | Chen et al. .................... 455/450 |
| 2009/0129259 | A1* | 5/2009 | Malladi et al. ................ 370/210 |
| 2009/0201861 | A1* | 8/2009 | Kotecha ........................ 370/329 |
| 2010/0046457 | A1* | 2/2010 | Abraham et al. ............. 370/329 |
| 2010/0238902 | A1* | 9/2010 | Ji et al. .......................... 370/331 |
| 2010/0284359 | A1* | 11/2010 | Kim et al. ..................... 370/329 |
| 2011/0019573 | A1* | 1/2011 | Ezri .............................. 370/252 |
| 2012/0020316 | A1* | 1/2012 | Dong et al. ................... 370/329 |

* cited by examiner

*Primary Examiner* — Warner Wong

(57) ABSTRACT

According to one aspect of the present invention, there is provided a method for feeding back Channel State Information (CSI) by a Base Station (BS) in a communication system using Space Division Multiple Access (SDMA). The CSI feedback method includes grouping Mobile Stations (MSs) into at least two groups; allocating a second feedback channel over which CSI is to be fed back, to semi-orthogonal MSs having a semi-orthogonal relationship with MSs included in a first group which is one of the at least two groups, among MSs included in a second group which is one of the at least two groups and is different from the first group; receiving CSIs being fed back from the semi-orthogonal MSs through the second feedback channel; and selecting at least one MS satisfying a semi-orthogonal criterion to the MSs included in the first group from among the semi-orthogonal MSs that feed back CSIs through the second feedback channel.

18 Claims, 5 Drawing Sheets

SDMA COMMUNICATION SYSTEM FOR FEEDING BACK CHANNEL STATE INFORMATION AND METHOD SUPPORTING THE SAME

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Feb. 20, 2008 and assigned Serial No. 10-2008-0015564, the disclosures of which are incorporated herein by reference.

TECHNICAL FIELD OF THE INVENTION

The present invention relates to a method and apparatus for feeding back Channel State Information (CSI) in a Space Division Multiple Access (SDMA) communication system.

BACKGROUND OF THE INVENTION

Currently, communication systems are evolving into next-generation mobile communication systems that provide high-speed multimedia services. The next-generation mobile communication systems use multiple access schemes proposed to make efficient use of their limited resources to provide high-speed multimedia services.

SDMA is one of the typical multiple access schemes. In a communication system using SDMA (hereinafter referred to as an "SDMA communication system"), when a Base Station (BS) uses a plurality of antennas, areas which are orthogonal to each other may be formed; the number of areas corresponds to the number of the antennas that also are orthogonal to each other. Thus, signals from Mobile Stations (MSs) located in different areas are removed by orthogonality between beams in antenna beam patterns during their transmission/reception, so the signals do not interfere with each other.

Meanwhile, the BS of the SDMA communication system can transmit data only to a small number of MSs for a given time. The BS selects MSs satisfying a semi-orthogonal criterion from among the MSs located in its service zone, as MSs to which it will simultaneously transmit data in the same time period. The semi-orthogonal criterion may include a value used for determining whether each MS is in an orthogonal state, a Signal to Noise Ratio (SNR) threshold, and the like. For example, the value used for detecting the orthogonal state can be CSI.

A description will now be made of an operation in which the BS chooses the MSs to which it simultaneously transmits data in the same time period.

The BS receives CSI that is fed back from each of multiple MSs, and selects MSs in their semi-orthogonal state by comparing the received CSIs with the semi-orthogonal criterion. In other words, the BS compares CSIs fed back from multiple MSs with a predetermined reference CSI, and chooses MSs that have fed back CSI being greater than or equal to the reference CSI, as MSs in a semi-orthogonal state.

In addition, a scheduling method by which the BS receives CSIs from MSs can be roughly classified into a periodic scheduling method and a dynamic scheduling method. In the periodic scheduling method, the BS receives CSIs fed back from MSs only in a specific period of a downlink (DL) frame. In the dynamic scheduling method, the BS sends a CSI feedback request to MSs whenever the need arises.

Regarding the periodic scheduling method, since the BS receives CSIs from MSs only in a predetermined time period, the MSs may suffer from an increase in CSI feedback delay, and the number of MSs from which the BS can receive CSIs may be limited undesirably. Also, as to the dynamic scheduling method, a downlink control signal needed for the CSI feedback request acts as overhead.

As described above, when using SDMA, the BS must receive all CSIs from multiple MSs in the same time period, in order to choose MSs in a semi-orthogonal state. The BS selects semi-orthogonal MSs by comparing the received CSIs with the reference CSI, thus causing an increase in computation.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention provides a CSI feedback method and apparatus for reducing overhead in an SDMA communication system.

Another aspect of the present invention provides a method for reducing overhead caused by CSI feedback and an SDMA communication system supporting the same.

According to one aspect of the present invention, there is provided a method for feeding back CSI by a BS in a communication system using SDMA. The CSI feedback method includes grouping MSs into at least two groups; allocating a second feedback channel, over which CSI is to be fed back, to semi-orthogonal MSs having a semi-orthogonal relationship with MSs included in a first group, that is one of the at least two groups among MSs included in a second group that is one of the at least two groups and is different from the first group; receiving CSIs being fed back from the semi-orthogonal MSs through the second feedback channel; and selecting at least one MS satisfying a semi-orthogonal criterion to the MSs included in the first group from among the semi-orthogonal MSs that feed back CSIs through the second feedback channel.

According to another aspect of the present invention, there is provided a method for feeding back CSI by a MS in a communication system using SDMA. The CSI feedback method includes monitoring CSIs which are fed back through a first feedback channel from MSs included in a first group being different from a group in which the MS is included; and transmitting CSI of the MS to a BS through a second feedback channel, when there is any CSI being semi-orthogonal to the CSI of the MS among the monitored CSIs.

According to yet another aspect of the present invention, there is provided a communication system using SDMA, for feeding back CSI. The communication system includes a BS and a plurality of MSs. The BS groups the plurality of MSs into at least two groups, allocates a second feedback channel over which CSI is to be fed back to semi-orthogonal MSs having a semi-orthogonal relationship with MSs included in a first group that is one of the at least two groups, among MSs included in a second group that is one of the at least two groups and is different from the first group, receives CSIs being fed back from the semi-orthogonal MSs through the second feedback channel, and selects at least one MS satisfying a semi-orthogonal criterion to the MSs included in the first group from among the semi-orthogonal MSs that feed back CSIs through the second feedback channel.

According to yet another aspect of the present invention, there is provided a communication system using SDMA for feeding back CSI. The communication system includes a BS, a MS, and a first-group of MSs, the MSs included in the first group being different from a group in which the MS is included. The MS monitors CSIs of the first-group of MSs, which are fed back through a first feedback channel, and transmits CSI of the MS to a BS through a second feedback channel when there is any CSI being semi-orthogonal to the CSI of the MS among the monitored CSIs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, the same drawing reference numerals will be understood to refer to the same elements, features and structures.

DETAILED DESCRIPTION OF THE INVENTION

Preferred embodiments of the present invention will now be described in detail with reference to the annexed drawings. In the following description, a detailed description of known functions and configurations incorporated herein has been omitted for clarity and conciseness.

The present invention provides an apparatus and method in which a BS selects semi-orthogonal MSs to which it will transmit data for the same time period, while reducing feedback overhead for CSI in a communication system using SDMA.

Figure 1:
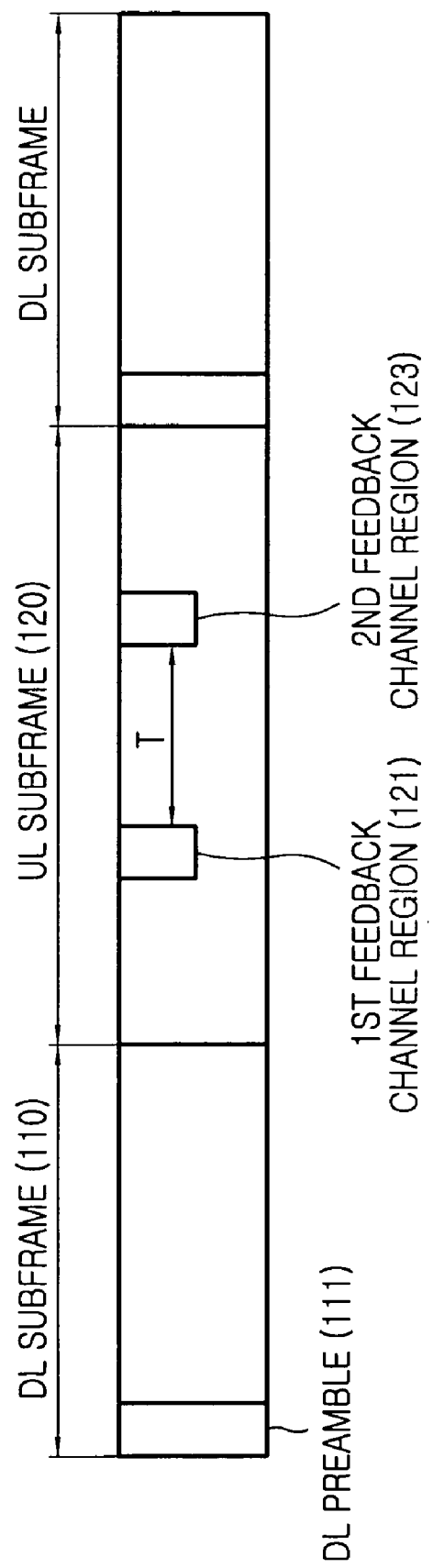
FIG. 1 is a diagram illustrating a frame structure for an SDMA communication system according to an embodiment of the present invention.

FIG. 1 is a diagram illustrating a frame structure for an SDMA communication system according to an embodiment of the present invention.

Referring to FIG. 1, one frame includes a downlink (DL) subframe 110 and an uplink (UL) subframe 120. The downlink subframe 110 includes a downlink preamble region 111, and the uplink subframe 120 includes a first feedback channel region 121 and a second feedback channel region 123. The first feedback channel region 121 and the second feedback channel region 123 are allocated such that they are spaced by a time period T. In some embodiments, the time period T is assumed to be set longer than an Rx-to-Tx turnaround Time Gap (RTG).

The first feedback channel region 121, a region that is allocated in every uplink subframe on a regular basis, has a very small capacity. Further, the first feedback channel region 121 is a region where a first feedback channel is allocated and an MS feeds back its CSI and Channel Quality Information (CQI) to a BS over the first feedback channel.

The second feedback channel region 123 is a region that is additionally allocated in every uplink subframe. The second feedback channel region 123 is a region where a second feedback channel is allocated. The second feedback channel is a contention-based random access feedback channel.

Although one UL subframe has been described in FIG. 1 by way of example, when the number of UL subframes constituting one frame is K, the first feedback channel region and the second feedback channel region are allocated in each of K UL subframes.

Figure 2:
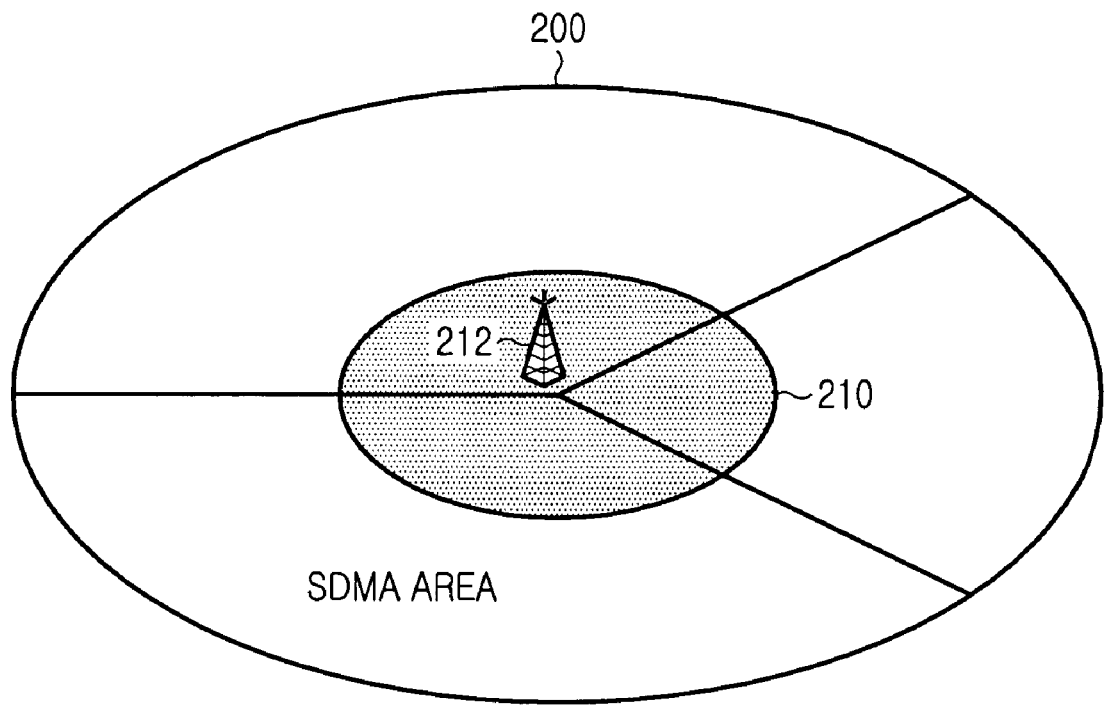
FIG. 2 is a diagram illustrating area configuration of a SDMA communication system according to an embodiment of the present invention.

FIG. 2 is a diagram illustrating an area configuration of a SDMA communication system according to an embodiment of the present invention.

Referring to FIG. 2, only a part of the total area 200 of the SDMA communication system can be an area where it is efficient to use SDMA. For example, an SDMA area 210 can be the area where it is efficient to use SDMA. BS 212 selects semi-orthogonal MSs in the SDMA area 210 that satisfy a predetermined semi-orthogonal criterion. When N MSs exist in the SDMA area 210, the BS 212 simultaneously schedules the N MSs in the same time period using the same frequency resources. MSs situated in the SDMA area 210 are characterized to have a higher Signal Noise Ratio (SNR) and a lower moving velocity. The semi-orthogonal criterion is identical to a semi-orthogonal criterion generally used to employ SDMA, and has nothing to do with the gist of the present invention, so a detailed description thereof will not be provided.

With reference to FIGS. 1 and 2, a description will now be made of a method wherein the BS 212 chooses semi-orthogonal MSs in the SDMA area 210. In the following description, it will be assumed that the full frame includes K UL subframes and a first feedback channel is allocated at a slot #k in each of the K UL subframes. In such embodiments, k denotes an index of an uplink subframe.

For example, the BS 212 groups N MSs into M groups. The MSs may undergo grouping according to a predetermined standard, or is subject to random grouping. In such example, M is less than N and, as regards to the number of MSs included in each group, the number of MSs included in the next group is much less than the number of MSs included in the previous group on a sequential basis.

The BS allocates a first feedback channel at a slot #1 to MSs included in a first group among the M groups. Thereafter, each of the MSs included in the first group feeds back CSI through the first feedback channel at the slot #1. The CSI fed back by each of the MSs includes a Connection Identifier (CID) of the corresponding MS.

In the meantime, all the remaining MSs except for the MSs included in the first group will listen to CSIs which are transmitted through the first feedback channel at the slot #1. On the other hand, in the region where the first feedback channel is allocated, the remaining MSs, except for the MSs included in the first group, cannot transmit traffics.

MSs belonging to a second group, out of the M groups, determine whether there is any CSI, among the CSIs they have listened to, semi-orthogonal to their own CSI. If it is determined that there is any semi-orthogonal CSI among the CSIs, that the MSs included in the first group have transmitted, the MSs belonging to the second group, that have the semi-orthogonal CSI, feed back their CSI to the BS through a second feedback channel at the slot #1. Among the MSs included in the second group, an MS having CSI semi-orthogonal to the CSIs, that the MSs included in the first group have transmitted, will be referred to herein as a "second semi-orthogonal MS."

MSs in the remaining groups, except for the MSs included in the first and second groups, will also listen to CSIs of MSs included in the first group being fed back over the first feedback channel, and CSIs of the second semi-orthogonal MSs being fed back through the second feedback channel, like the MSs included in the second group.

MSs included in a third group determine whether there are any CSI, among the MSs' CSIs being fed back through the first feedback channel and the CSIs of the second semi-orthogonal MSs, being fed back over the second feedback channel, semi-orthogonal to their own CSI. If it is determined that there are any CSI semi-orthogonal to the CSIs transmitted over the first feedback channel and the CSIs transmitted through the second feedback channel, MSs having the semi-orthogonal CSI, among the MSs included in the third group, feed back their own CSI to the BS over the second feedback channel of a slot #2. Among the MSs included in the third group, an MS having CSI semi-orthogonal to the CSIs, that the MSs included in the first group have transmitted and the CSIs that the second semi-orthogonal MSs have transmitted, will be referred to herein as a "third semi-orthogonal MS."

Similarly, all of MSs included in the remaining groups, except for the MSs included in the first and second groups, will proceed with the above procedure on a sequential basis.

Figure 3:
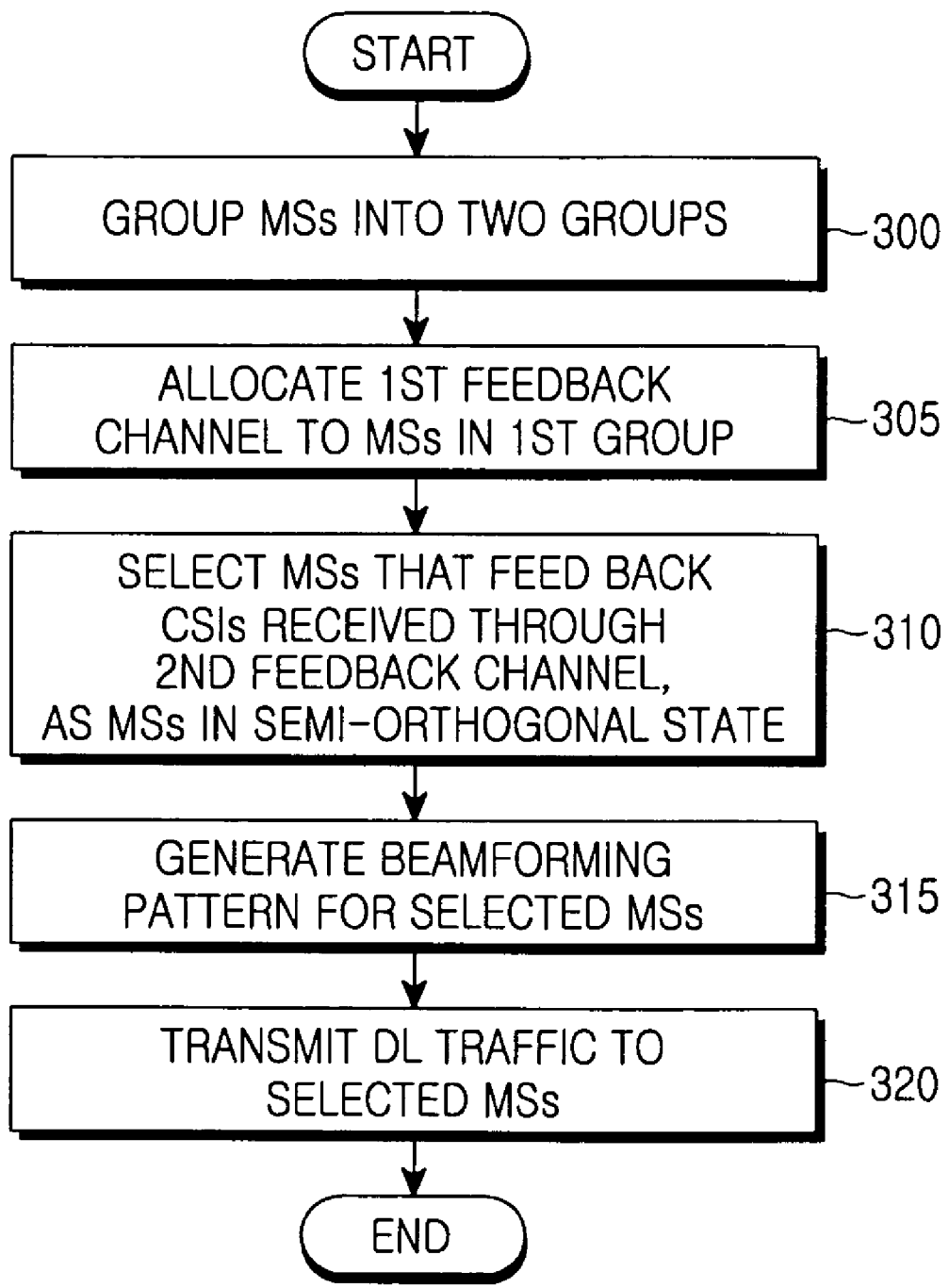
FIG. 3 is a flowchart illustrating an operation process of a BS in an SDMA communication system according to an embodiment of the present invention.
Figure 4:
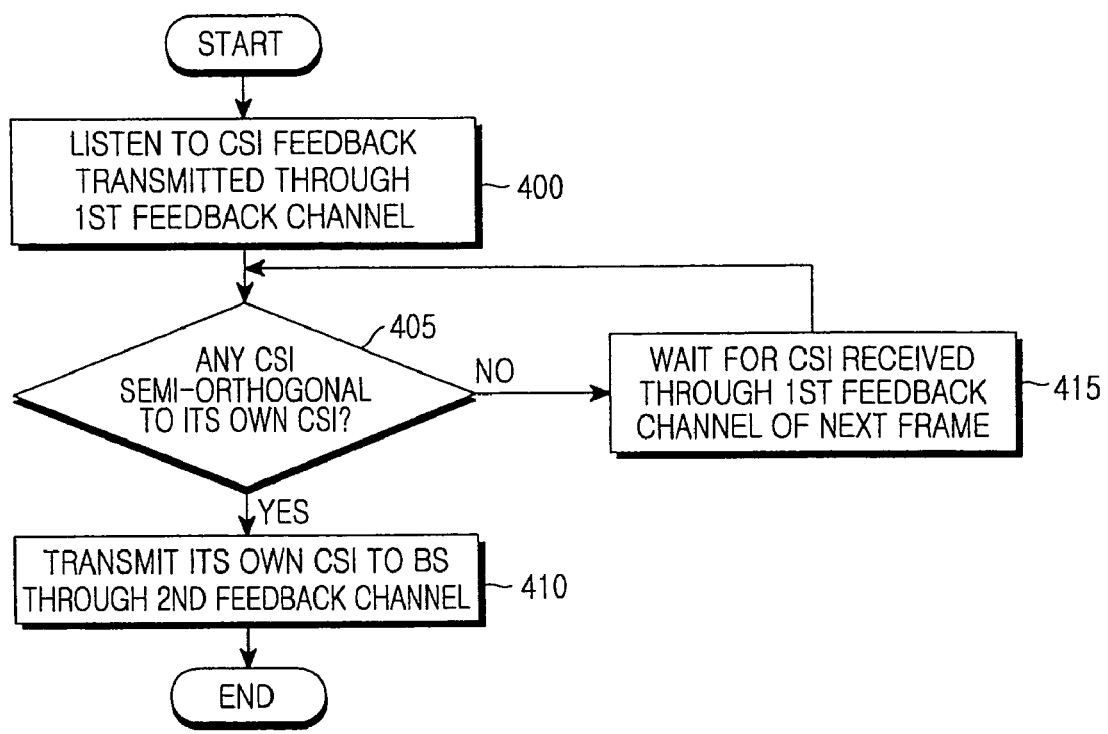
FIG. 4 is a flowchart illustration an example of an MS's operation process corresponding to the base station's operation process of FIG. 3.
Figure 5:
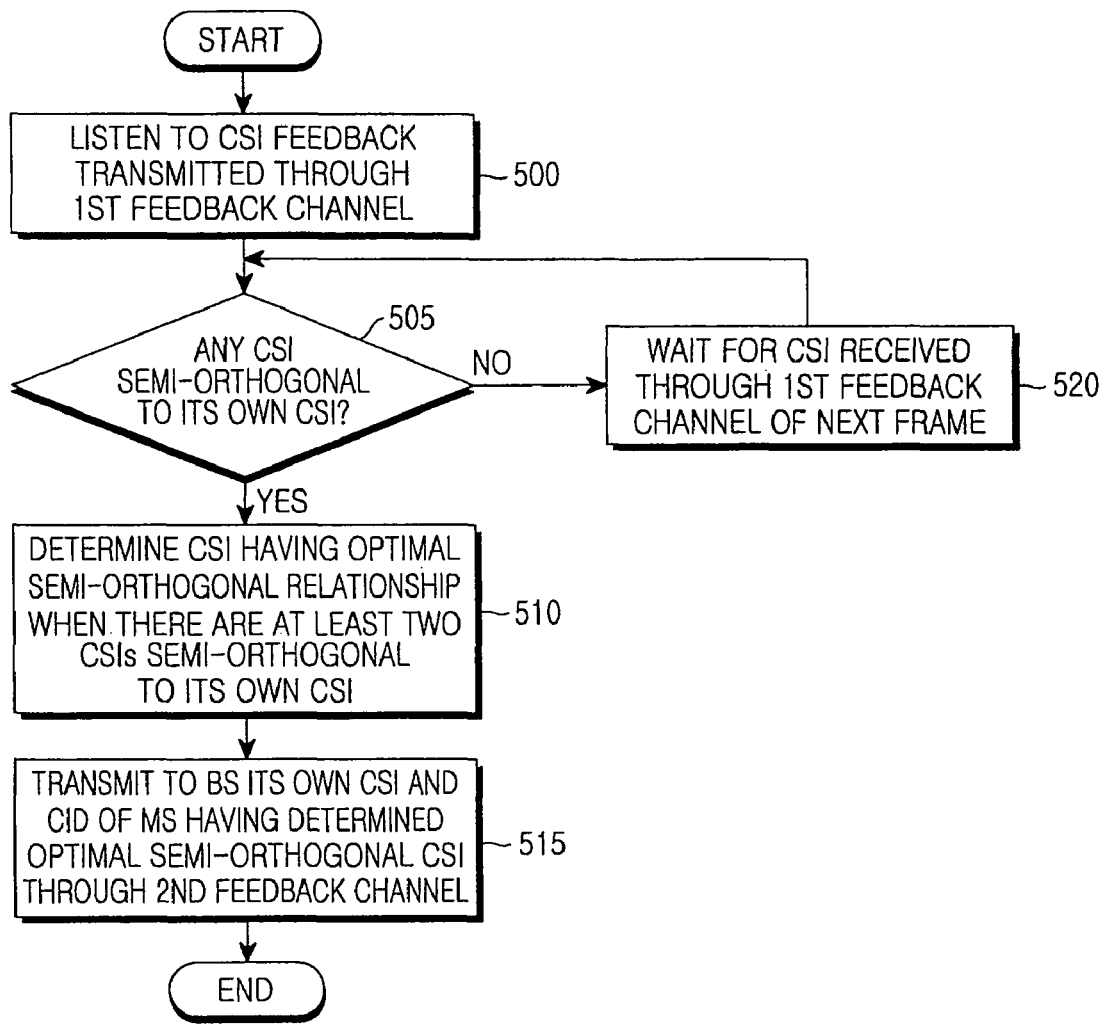
FIG. 5 is a flowchart illustrating another example of a mobile station's operation process corresponding to the base station's operation process of FIG. 3.

With reference to FIGS. 3 to 5, embodiments of the present invention will be described in detail. In the following description, a BS can group MSs into, for example, two groups: a first group and a second group.

FIG. 3 is a flowchart illustrating an operation process of a BS in an SDMA communication system according to an embodiment of the present invention.

Before a description of FIG. 3 is given, it will be assumed that N MSs are located in an SDMA area in a service zone managed by the BS.

Referring to FIG. 3, in step 300, the BS groups the N MSs into 2 groups: a first group and a second group. In step 305, the BS allocates a first feedback channel to MSs included in the first group. Although not separately illustrated in FIG. 3, among the MSs included in the second group, MSs, CSIs of which are semi-orthogonal to the CSIs being fed back through the first feedback channel, will feed back their CSIs through the second feedback channel. In some embodiments, the MSs that feed back their CSIs over the second feedback channel are MSs that have a semi-orthogonal relationship corresponding to a predetermined semi-orthogonal criterion acquired by monitoring the CSIs transmitted through the first feedback channel from among the MSs included in the second group.

In step 310, the BS chooses MSs that have fed back the CSIs received through the second feedback channel, as MSs included in the first group and MSs in a semi-orthogonal state. In such embodiments, the BS chooses the MSs included in the first group and the MSs in the semi-orthogonal state using the predetermined semi-orthogonal criterion. It will be understood that the operation in which the BS selects the MSs included in the first group and the MSs in the semi-orthogonal state is not directly related to the scope of the present invention, so a detailed description thereof will be omitted herein.

In step 315, the BS creates a beam forming pattern for the selected MSs. In step 320, the BS transmits data to the selected MSs using the generated beam forming pattern.

FIG. 4 is a flowchart illustration an example of an MS's operation process corresponding to the BS's operation process of FIG. 3.

Referring to FIG. 4, in step 400, each of MSs included in the second group listens to CSIs transmitted over the first feedback channel from MSs included in the first group. In step 405, each of the MSs included in the second group determines whether there are any CSI, among the listened CSIs, semi-orthogonal to its own CSI. If it is determined that there are any semi-orthogonal CSI, the corresponding MS, i.e., a second semi-orthogonal MS, proceeds to step 410 where the second semi-orthogonal MS feeds back its own CSI over the second feedback channel.

However, if it is determined, in step 405, that there is no semi-orthogonal CSI, each of the MSs included in the second group proceeds to step 415 where each of the MSs waits for CSI received through a first feedback channel of the next frame. Thereafter, the MS returns to step 405 upon receiving CSI through the first feedback channel of the next frame and ends the process upon failure to receive the CSI.

The above MS's operation is carried out in every frame.

FIG. 5 is a flowchart illustrating another example of an MS's operation process corresponding to the BS's operation process of FIG. 3.

Referring to FIG. 5, in step 500, each of the MSs included in the second group listens to CSIs transmitted through the first feedback channel from MSs included in the first group. In step 505, each of the MSs included in the second group determines whether there are any CSI, among the listened CSIs semi-orthogonal to its own CSI. If it is determined that there are any semi-orthogonal CSI, the corresponding MS, i.e., a second semi-orthogonal MS, proceeds to step 510 where the second semi-orthogonal MS determines CSI having the optimal semi-orthogonal relationship with its own CSI, if there are at least two CSIs being semi-orthogonal to its CSI. In step 515, the second semi-orthogonal MS transmits a CID of the MS included in the first group, which has transmitted the CSI having the optimal semi-orthogonal relationship with its own CSI, to the BS through the second feedback channel.

However, if it is determined, in step 505, that there is no semi-orthogonal CSI, each of the MSs included in the second group proceeds to step 520 where each of the MSs waits for CSI received through the first feedback channel of the next frame. Thereafter, the MS returns to step 505 upon receiving CSI through the first feedback channel of the next frame and ends the process upon failure to receive the CSI.

The above MS's operation is performed in every frame.

As is apparent from the foregoing description, the present invention contributes to a reduction in CSI feedback needed to select semi-orthogonal MSs in the SDMA communication system. Therefore, the present invention can reduce CSI feedback overhead in the SDMA communication system, thus improving performance of the SDMA communication system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving channel state information feedback back by a base station in a communication system using Space Division Multiple Access, the method comprising:
grouping mobile stations into at least two groups;
monitoring channel state information fed back through a first feedback channel from mobile stations included in a first group different from a second group;
allocating a second feedback channel, over which channel state information is to be fed back, to semi-orthogonal mobile stations having a semi-orthogonal relationship with mobile stations included in a first group of the two groups among mobile stations included in a second group of the two groups and the second group is different from the first group;
receiving channel state information fed back from the semi-orthogonal mobile stations through the second feedback channel; and
selecting at least one mobile station satisfying a semi-orthogonal criterion to the mobile stations included in the first group from among the semi-orthogonal mobile stations that feed back channel state information through the second feedback channel.

2. The method of claim 1, further comprising:
Receiving, through the second feedback channel, a connection identifier of an mobile station, channel state information that has an optimal semi-orthogonal relationship with channel state information of the semi-orthogonal mobile stations among the mobile stations included in the first group.

3. The method of claim 1, further comprising:
allocating the first feedback channel, over which channel state information is to be fed back, to mobile stations included in the first group;
wherein the first feedback channel is spaced from the second feedback channel by a set time period.

4. The method of claim 1, wherein mobile stations included in the at least two groups are located in a particular area in a service zone of the base station.

5. A method for feeding back channel state information by a mobile station in a communication system using Space Division Multiple Access, the method comprising:
monitoring, by a mobile station included in a second group, channel state information fed back through a first feedback channel from mobile stations included in a first group different from second group; and
when there is a channel state information semi-orthogonal to a channel state information of the mobile station among the monitored channel state information, transmitting, by the mobile station included in the second group, the channel state information of the mobile station to a base station through a second feedback channel.

6. The method of claim 5, further comprising:
transmitting, by the mobile station included in the second group, to the base station through the second feedback channel a connection identifier of a different mobile station included in the first group corresponding to channel state information having an optimal semi-orthogonal relationship with the channel state information of the first mobile station among the monitored channel state information when there is the channel state information semi-orthogonal to the channel state information of the mobile station.

7. The method of claim 5, wherein the second feedback channel is a contention-based random access channel.

8. The method of claim 5, wherein the first feedback channel and the second feedback channel are spaced by a set time period.

9. The method of claim 5, wherein mobile stations included in the second group and the mobile stations included in the first group are located in a particular area in a service zone of the base station.

10. A base station for receiving channel state information feedback back in a communication system using Space Division Multiple Access,
wherein the base station is configured to:
monitor channel state information fed back through a first feedback channel from mobile stations included in a first group different from a second group,
group the plurality of mobile stations into at least two groups,
allocate a second feedback channel over which channel state information is to be fed back to semi-orthogonal mobile stations having a semi-orthogonal relationship with a first number of mobile stations included in a first group of the at least two groups among a second number of mobile stations included in a second group of the at least two groups, the second group different than the first group,
receive channel state information fed back from the semi-orthogonal mobile stations through the second feedback channel, and
select at least one mobile station satisfying a semi-orthogonal criterion to the first number of mobile stations from among the semi-orthogonal mobile station that feed back channel state information through the second feedback channel.

11. The communication system of claim 10, wherein the base station receives, through the second feedback channel a connection identifier of a mobile station channel state information that has an optimal semi-orthogonal relationship with channel state information of the semi-orthogonal mobile stations among the first number of mobile stations.

12. The communication system of claim 10, wherein the base station allocates the first feedback channel over which channel state information is fed back to the first number of mobile stations and the first feedback channel is spaced from the second feedback channel by a set time period.

13. The communication system of claim 10, wherein the plurality of mobile stations included in the at least two groups are located in a particular area in a service zone of the base station.

14. A mobile station for feeding back channel state information in a communication system using Space Division Multiple Access,
wherein the mobile station, included in a second group of mobile stations, monitors channel state information fed back from mobiles stations included in a first group different from the second group through a first feedback channel, and when there is a channel state information semi-orthogonal to a channel state information of the mobile station among the monitored channel state information, transmits the channel state information of the mobile station to the base station through a second feedback channel.

15. The communication system of claim 14, wherein the mobile station transmits to the base station through the second feedback channel a connection identifier of a different mobile station included in the first group corresponding to channel state information having an optimal semi-orthogonal relationship with the channel state information of the mobile station among the monitored channel state information when there is a channel state information semi-orthogonal to the channel state information of the mobile station.

16. The communication system of claim 14, wherein the second feedback channel is a contention-based random access channel.

17. The communication system of claim 14, wherein the first feedback channel and the second feedback channel are spaced by a set time period.

18. The communication system of claim 14, wherein mobile stations included in the second group and mobile stations included in the second group are located in a particular area in a service zone of the base station.

* * * * *